United States Patent
Kim

(10) Patent No.: US 9,096,221 B2
(45) Date of Patent: Aug. 4, 2015

(54) METHOD AND SYSTEM FOR CONTROLLING CHARGING AND DISCHARGING FOR A HYBRID VEHICLE

(71) Applicants: Hyundai Motor Company, Seoul (KR); Kia Motors Corporation, Seoul (KR)

(72) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 125 days.

(21) Appl. No.: 13/934,609

(22) Filed: Jul. 3, 2013

(65) Prior Publication Data
US 2014/0148983 A1    May 29, 2014

(30) Foreign Application Priority Data
Nov. 23, 2012    (KR) .................. 10-2012-0133818

(51) Int. Cl.
*B60W 20/00*    (2006.01)
*B60W 10/06*    (2006.01)
*B60W 10/08*    (2006.01)
*B60W 10/196*    (2012.01)

(52) U.S. Cl.
CPC .......... *B60W 20/1062* (2013.01); *B60W 10/06* (2013.01); *B60W 10/08* (2013.01); *B60W 10/196* (2013.01); *B60W 2600/00* (2013.01); *Y02T 10/6286* (2013.01); *Y02T 10/7005* (2013.01); *Y10S 903/93* (2013.01)

(58) Field of Classification Search
CPC . B60W 20/106; B60W 20/108; B60W 20/10; B60W 30/18127
See application file for complete search history.

(56) References Cited

U.S. PATENT DOCUMENTS

| | | | |
|---|---|---|---|
| 6,233,508 B1* | 5/2001 | Deguchi et al. | 701/22 |
| 2013/0041534 A1* | 2/2013 | Kim | 701/22 |
| 2013/0179014 A1* | 7/2013 | Yamazaki et al. | 701/22 |
| 2013/0338862 A1* | 12/2013 | Guerin et al. | 701/22 |
| 2014/0074331 A1* | 3/2014 | Shin et al. | 701/22 |
| 2014/0155222 A1* | 6/2014 | Kim | 477/5 |

FOREIGN PATENT DOCUMENTS

| | | |
|---|---|---|
| JP | 3772876 B2 | 5/2006 |
| JP | 2009220788 | 10/2009 |
| KR | 10-0460893 | 12/2004 |

* cited by examiner

*Primary Examiner* — Edwin A Young
(74) *Attorney, Agent, or Firm* — Mintz Levin Cohn Ferris Glovsky and Popeo, P.C.; Peter F. Corless

(57) ABSTRACT

A method and system for controlling charging and discharging for a hybrid vehicle that may consume regenerative electric power collected by a motor through regenerative braking while coasting the hybrid vehicle when operating an integrated starter-generator (ISG) according to a state of charge (SOC) of a battery. The method of controlling charging and discharging for a hybrid vehicle which includes a motor operated by power of a battery and an ISG configured to start an engine or generate electric power by torque of the engine includes: changing a running mode of the hybrid vehicle to a regenerative braking mode when the hybrid vehicle is coasting, controlling the motor to generate electric power in the regenerative braking mode, determining whether an SOC of the battery is a charge limiting state, and operating the ISG by electric power generated by the motor when the SOC of the battery is the charge limiting state.

11 Claims, 7 Drawing Sheets

RELATED ART

RELATED ART

RELATED ART

RELATED ART

METHOD AND SYSTEM FOR CONTROLLING CHARGING AND DISCHARGING FOR A HYBRID VEHICLE

CROSS-REFERENCE TO RELATED APPLICATION

This application claims priority to and the benefit of Korean Patent Application No. 10-2012-0133818 filed in the Korean Intellectual Property Office on Nov. 23, 2012, the entire contents of which are incorporated herein by reference.

BACKGROUND (a) Technical Field

The present disclosure relates generally to a method and a system for controlling charging and discharging for a hybrid vehicle, and more particularly, to a method and system for controlling charging and discharging for a hybrid vehicle that may consume regenerative electric power collected by a motor through regenerative braking during coasting of the hybrid vehicle when operating an integrated starter-generator (ISG) according to a state of charge (SOC) of a battery.

(b) Description of the Related Art

Hybrid vehicles operate through the use of power from an internal combustion engine and power from a battery. In particular, hybrid vehicles are designed to efficiently combine and use power of the internal combustion engine and the motor. For example, as illustrated in FIG. 1, a hybrid vehicle includes: an engine 10; a motor 20; an engine clutch 30 which controls power connection between the engine 10 and the motor 20; a transmission 40; a differential gear unit 50; a battery 60; an integrated starter-generator (ISG) 70 which starts the engine 10 or generates electric power by output of the engine 10; and wheels 80.

As further shown, the hybrid vehicle includes: a hybrid control unit (HCU) 200 for controlling an overall operation of the hybrid vehicle; an engine control unit (ECU) 110 for controlling an operation of the engine 10; a motor control unit (MCU) 120 for controlling an operation of the motor 20; a transmission control unit (TCU) 140 for controlling an operation of the transmission 40; and a battery control unit (BCU) 160 for managing and controlling the battery 60. The BCU 160 may also be referred to as a battery management system (BMS). The ISG 70 may also be referred to as a starting/generating motor or a hybrid starter-generator (HSG).

The hybrid electric vehicle may be driven in a driving mode, such as an electric vehicle (EV) mode, which is a mode of a true electric vehicle solely using power of the motor 20; a hybrid electric vehicle (HEV) mode using torque of the motor 20 as auxiliary power while using torque of the engine 10 as main power; and a regenerative braking (RB) mode collecting braking and inertia energy through power generation of the motor 20 to charge the battery 60 during braking or driving using the inertia of the vehicle. The motor 20 of the hybrid vehicle generally operates as a generator for collecting the inertia energy during the regenerative braking (RB) mode. The running by inertia energy of the hybrid vehicle may be referred to coasting.

As shown in FIG. 2, by setting a minus torque to the motor while coasting, the inertia energy may be collected as regenerative electric power. When the motor operates as a generator, the regenerative electric power generally charges the battery of the hybrid vehicle. However, when the battery is in a fully charged state such that charging is limited or in an over-temperature state, the regenerative electric power from the motor 20 cannot charge the battery.

When the battery is in the fully charged state during coasting, a conventional method known in the related art performs fuel-cut control instead of the regenerative braking so as to use a friction torque (minus torque) of the engine, as shown in FIG. 3. Because the friction torque of the engine while the fuel is cut is transmitted to an axle through the engine clutch, the same drivability as during the regenerative braking by the motor may be accomplished. However, the friction torque cannot be varied, and when the shift gear of the transmission is changed, drivability may rapidly deteriorate.

Further, in another conventional method known in the related art, when the battery is in the fully charged state during coasting, the regenerative electric power of the motor produced by the regenerative braking is consumed by an air conditioner or heater 90. However, due to the unwanted operation of the air conditioner or heater, the temperature in the hybrid vehicle may be changed.

The above information disclosed in this Background section is only for enhancement of understanding of the background of the described technology and therefore it may contain information that does not form the related art that is already known to a person of ordinary skill in the art.

SUMMARY

The present disclosure has been made in an effort to provide a method and a system for controlling charging and discharging for a hybrid vehicle which is able to protect a battery and to enhance drivability by consuming regenerative electric power collected by a motor through regenerative braking while coasting when operating an integrated starter-generator (ISG) according to a state of charge (SOC) of a battery.

An exemplary embodiment of the present disclosure provides a method of controlling charging and discharging for a hybrid vehicle, wherein the hybrid vehicle includes a motor operated by power of a battery and an ISG configured to start an engine or generate electric power by torque of the engine, the method including: changing a running mode of the hybrid vehicle to a regenerative braking mode when the hybrid vehicle is coasting, controlling the motor to generate electric power in the regenerative braking mode, determining whether an SOC of the battery is a charge limiting state, and operating the ISG by electric power generated by the motor when the SOC of the battery is the charge limiting state.

The method further includes charging the battery with the electric power generated by the motor up to the charge limiting state when the SOC of the battery is not the charge limiting state of the battery, and then operating the ISG by the electric power generated by the motor when the SOC of the battery is the charge limiting state. The operating of the ISG by the electric power generated by the motor includes setting a speed of the ISG based on speed of the engine and a predetermined friction torque map related to operation of the engine. Further, an engine clutch configured to control power transmission between the engine and the motor is in an open state.

Another exemplary embodiment of the present disclosure provides a system for controlling charging and discharging for a hybrid vehicle, the system including: a motor configured to be operated by power of a battery, an ISG configured to start an engine or generate electric power by torque of the engine, an engine clutch configured to control power transmission between the engine and the motor, and a control unit configured to operate the ISG using electric power generated by the motor in a regenerative braking mode when the hybrid vehicle is coasting and the battery is in a charge limiting state.

The control unit may include: a coasting determination unit configured to determine whether the hybrid vehicle is in a coasting state based on a signal according to manipulation of an accelerator pedal and a brake pedal, a regenerative braking mode changing unit configured to change a running mode to a regenerative braking mode when the hybrid vehicle is in a coasting state, an SOC determination unit configured to determine an SOC of the battery, an ISG speed control unit configured to control speed of the ISG based on speed of the engine and a predetermined friction torque map related to operation of the engine, and a charging/discharging control unit configured to control charging and discharging based on signals from the coasting determination unit, the regenerative braking mode changing unit, the SOC determination unit, and the ISG speed control unit while the hybrid vehicle is coasting.

As described above, according to an exemplary embodiment of the present disclosure, it is possible to protect a battery and to enhance drivability by consuming regenerative electric power collected by a motor through regenerative braking while coasting when operating an ISG according to an SOC of a battery.

BRIEF DESCRIPTION OF THE DRAWINGS

The foregoing and other objects, features, aspects and advantages of the disclosure will become more apparent from the detailed description when taken in conjunction with the following accompanying drawings.

Figure 1:
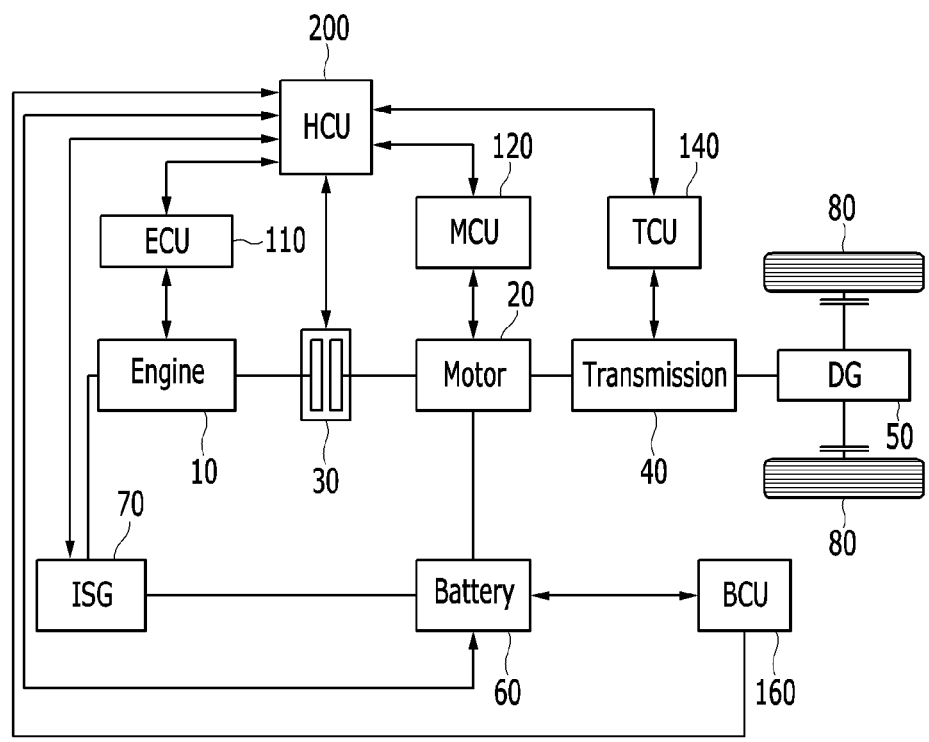
FIG. 1 is an exemplary block diagram illustrating a configuration of a typical hybrid vehicle.
Figure 2:
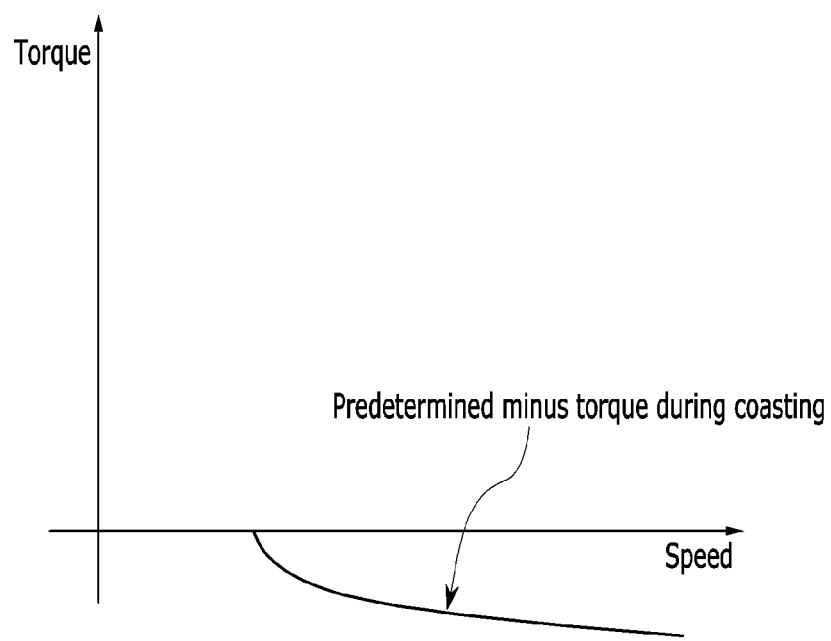
FIG. 2 is an exemplary graph illustrating minus torque of a motor corresponding to coasting torque of a hybrid vehicle.
Figure 3:
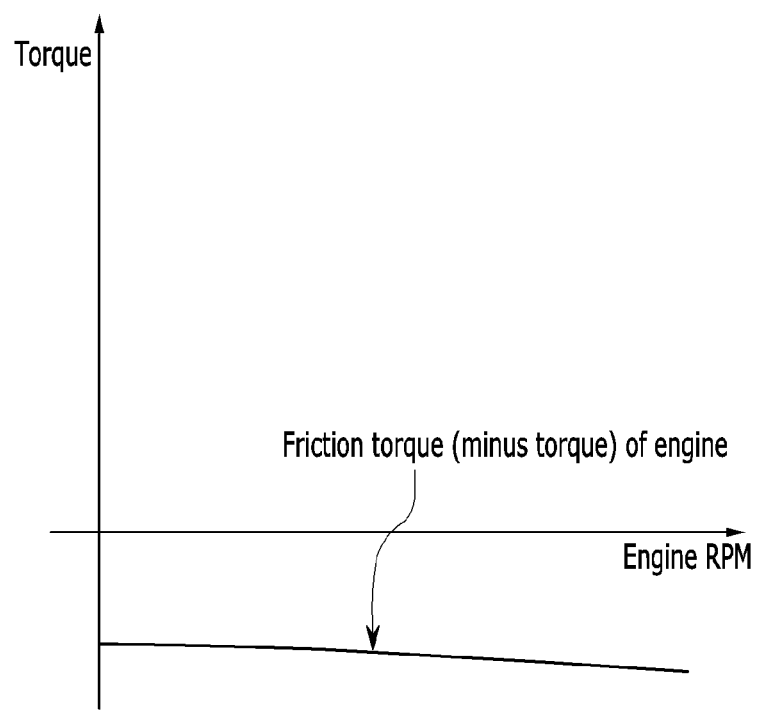
FIG. 3 is an exemplary graph illustrating minus torque of an engine corresponding to coasting torque of a hybrid vehicle.
Figure 4:
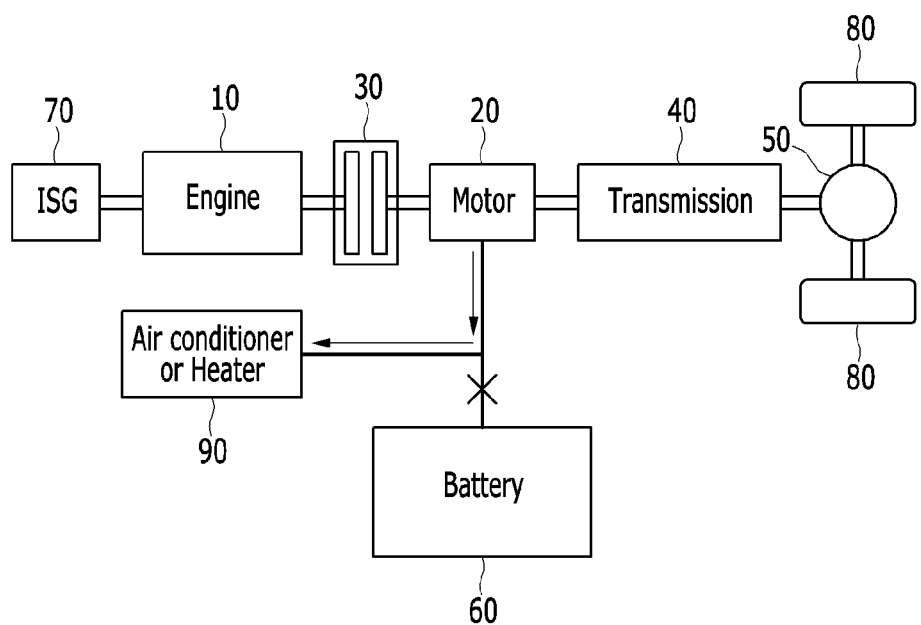
FIG. 4 is an exemplary configuration diagram of a system for controlling charging and discharging of a hybrid vehicle while coasting according to conventional system known in the related art.

Reference numbers refer to the same or equivalent parts of the present disclosure throughout the figures. It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

DETAILED DESCRIPTION OF THE EMBODIMENTS

Hereinafter, the contents of the present disclosure will be described more fully with reference to the accompanying drawings, in which exemplary embodiments of the disclosure are shown. As those skilled in the art would realize, the described embodiments may be modified in various different ways, all without departing from the spirit or scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Additionally, it is understood that the below methods are executed by at least one control unit. The term "control unit" refers to a hardware device that includes a memory and a processor. The memory is configured to store program instructions and the processor is specifically configured to execute said program instructions to perform one or more processes which are described further below.

The various control units of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a diagram illustrating a typical hybrid vehicle to which a system for controlling charging and discharging while coasting according to an exemplary embodiment of the present disclosure may be applied. As shown in FIG. 1, the hybrid vehicle generally includes an engine 10, a motor 20, an engine clutch 30, a transmission 40, a differential gear unit 50, a battery 60, and an integrated starter-generator 70. The engine clutch 30 controls power transmission between the engine 10 and the motor 20, and the integrated starter-generator 70 starts the engine 10 or generates electric power by output of the engine 10.

The hybrid vehicle to which the system for controlling the charging and the discharging while coasting according to the exemplary embodiment of the present invention can be applied further includes a hybrid control unit (HCU) 200 configured to control an overall operation of the hybrid electric vehicle, an engine control unit (ECU) 110 configured to control an operation of the engine 10, a motor control unit (MCU) 120 configured to control an operation of the motor 20, a transmission control unit (TCU) 140 configured to control an operation of the transmission 40, and a battery control unit (BCU) 160 configured to manage and control the battery 60.

Figure 5:
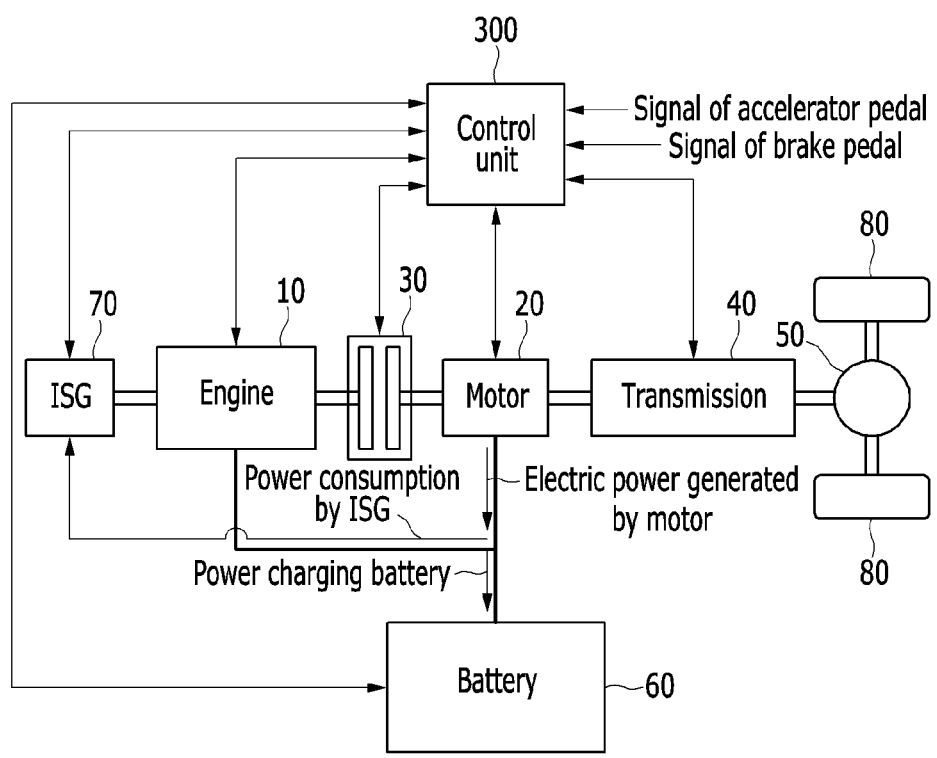
FIG. 5 is an exemplary configuration diagram of a system for controlling charging and discharging of a hybrid vehicle while coasting according to an exemplary embodiment of the present disclosure.

FIG. 5 is a configuration diagram of a system for controlling charging and discharging of a hybrid vehicle while coasting according to an exemplary embodiment of the present disclosure. Operationally, the system consumes regenerative electric power collected by a motor through regenerative braking of a hybrid vehicle while coasting when operating an ISG according to an SOC of a battery.

Illustratively, the system may include a motor 20, an integrated starter-generator (ISG) 70, an engine clutch 30, and a control unit 300. The motor 20 is operated by power of a battery 60, the ISG 70 starts an engine 10 or generates electric power by torque of the engine 10, and the engine clutch 30 controls connection between the engine 10 and the motor 20. The control unit 300 controls the ISG 70 to be operated by electric power generated by the motor 20 in a regenerative braking mode while coasting according to an SOC of the battery when the hybrid vehicle is coasting and the SOC of the battery 60 is in a charge limiting state. The engine 10, the motor 20, the engine clutch 30, the battery 60, and the integrated starter-generator 70 are components generally included in the hybrid vehicle, so detailed descriptions thereof will be omitted in the present specification.

The control unit 300 may be made up of one or more processors or microprocessors and/or hardware operated by a program including a series of commands for executing a method of controlling charging and discharging of a hybrid vehicle while coasting according to an exemplary embodiment of the present disclosure, which will be described below. In the exemplary embodiment of the present disclosure, the control unit 300 may include an engine control unit (ECU) configured to control operation of the engine 10, a motor control unit (MCU) configured to control operation of the motor 20, a battery control unit (BCU) configured to manage and control the battery 60, and a hybrid control unit (HCU) configured to control overall operation of the hybrid electric vehicle which includes operation of the ISG 70.

In the exemplary method of controlling charging and discharging of a hybrid vehicle while coasting according to an exemplary embodiment of the present disclosure which will be described below, some processes may be performed by the ECU, other processes may be performed by the MCU, and yet further processes may be performed by the BCU or the HCU. However, it should be understood that the scope of the present disclosure is not limited to the exemplary embodiment to be described below. The control unit may be implemented with a different combination from that described in the exemplary embodiment of the present disclosure. Therefore, the ECU, the MCU, the BCU, and the HCU may perform a different combination of processes from that described in the exemplary embodiment of the present disclosure.

Figure 6:
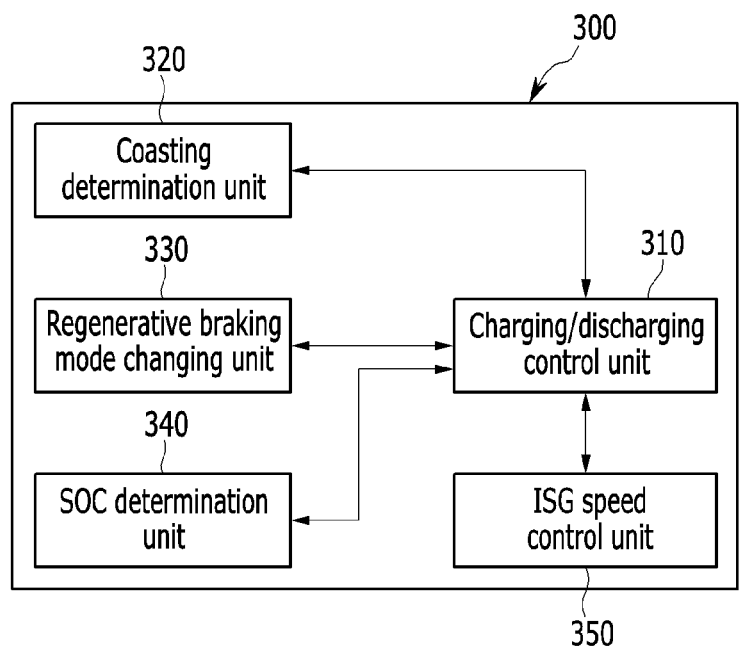
FIG. 6 is an exemplary block diagram illustrating a charging/discharging control unit illustrated in FIG. 5 in detail according to an exemplary embodiment of the present disclosure.

The control unit 300 may be made up of detailed constituent elements as shown in FIG. 6. The detailed constituent elements illustrated in FIG. 6 may be configured with one or more modules implemented as hardware and/or software. The hardware may include electric/electronic components and/or microprocessors and/or microcomputers and the like.

Illustratively, the control unit 300 may include: a coasting determination unit 320, a regenerative braking mode changing unit 330, an SOC determination unit 340, an ISG speed control unit 350, and a charging/discharging control unit 310. The coasting determination unit 320 determines whether the hybrid vehicle is in a coasting state, based on a signal according to manipulation of an accelerator pedal and a brake pedal. The regenerative braking mode changing unit 330 changes to a regenerative braking mode when the hybrid vehicle is in a coasting state. The SOC determination unit 340 determines an SOC of the battery 60, and the ISG speed control unit 350 controls speed of the ISG based on speed of the engine 10 and a predetermined friction torque map related to operation of the engine 10. The charging/discharging control unit 310 controls charging and discharging based on signals from the coasting determination unit 320, the regenerative braking mode changing unit 330, the SOC determination unit 340, and the ISG speed control unit 350 while the hybrid vehicle is coasting.

In an exemplary embodiment of the present disclosure, for example, the coasting determination unit 320 may determine when both an accelerator pedal and a brake pedal are not manipulated by a driver, and thus conclude that the vehicle is coasting, but it should be understood that the present disclosure is not limited thereto. If the hybrid vehicle is substantially running by inertia, a technical spirit of the present disclosure is applicable thereto.

Hereinafter, a method of controlling charging and discharging of a hybrid vehicle while coasting according to an exemplary embodiment of the present disclosure will be described in detail with reference to the accompanying drawings.

Figure 7:
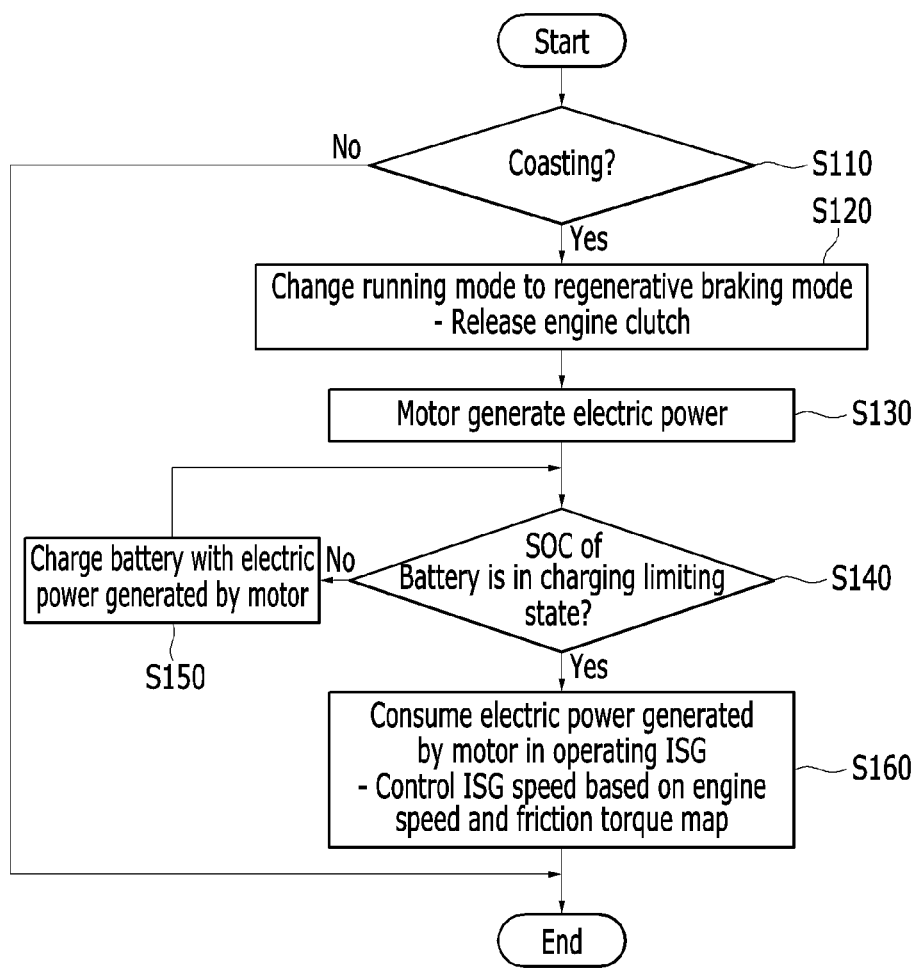
FIG. 7 is an exemplary flowchart of a method of controlling charging and discharging of a hybrid vehicle while coasting according to an exemplary embodiment of the present disclosure.

In this regard, FIG. 7 is an exemplary flowchart of a method of controlling charging and discharging of a hybrid vehicle while coasting according to an exemplary embodiment of the present disclosure. As illustrated in FIG. 7, the coasting determination unit 320 of the control unit 300 determines whether the hybrid vehicle is in coasting state (S110). The coasting, for example, may be when both an accelerator pedal and a brake pedal are not manipulated by a driver. When both the accelerator pedal and the brake pedal are not manipulated by the driver, the signal according to manipulation of the accelerator pedal and the brake pedal may not be generated. In step S110, when the hybrid vehicle is in the coasting state, the regenerative braking mode changing unit 330 of the control unit 300 changes the running mode to a regenerative braking mode (S120).

After changing to the regenerative braking mode, the control unit 300 may control the engine clutch 30 to be in an open state so that the regenerative braking may be properly implemented. In step 130, after changing to the regenerative braking mode, the motor 20 starts to generate electric power according to the regenerative braking mode (S130).

Subsequently, the control unit 300 determines whether an SOC of the battery 60 is a charge limiting state before charging the battery 60 with the electric power generated by the motor (S140). The charge limiting state, for example, may be when the SOC of the battery 60 is 90% or above. In general, an SOC of 100% means that the battery is fully charged, and an SOC of 0% means that the battery is fully discharged. A process of determining whether the SOC of the battery 60 is the charge limiting state may depend on the process in which the BCU 160, according to the related art, determines whether an SOC of a battery is a charge limiting state.

In step S140, when the SOC of the battery 60 is not in the state of limiting the charging of the battery 60, the control unit 300 charges the battery 60 with the electric power generated by the motor 20 (S150). As the control unit 300 charges the battery 60 with the electric power generated by the motor 20, the control unit 300 continuously monitors and determines whether the SOC of the battery 60 reaches the charge limiting state.

When the SOC of the battery 60 has reached the charge limiting state, the charging/discharging control unit 310 of the control unit 300 operates and controls the ISG 70 by electric power generated by the motor 20 so that the electric power generated by the motor 20 is consumed in the ISG 70 (S160). When the charging/discharging control unit 310 operates and controls the ISG 70, the ISG speed control unit 350 of the control unit 300 controls a speed and/or torque of the ISG 70 so that the electric power generated by the motor 20 may be totally consumed in the ISG 70.

The ISG speed control unit 350 may control the speed of the ISG 70 based on speed of the engine 10 and a predetermined friction torque map of the engine 10 stored in the ECU 110. For example, when an SOC of the battery 60 is a charge limiting state and electric power generated by the motor 20 is 5 kW, the ISG speed control unit 350 controls speed of the ISG 70 so that 5 kW is totally consumed in the ISG 70.

Accordingly, the method according to the exemplary embodiment of the present disclosure may consume regenerative electric power collected by the motor through regenerative braking while coasting when operating an ISG according to an SOC of a battery.

While this disclosure has been in connection with what is presently considered to be exemplary embodiments, it is to be understood that the disclosure is not limited to the disclosed embodiments, but, on the contrary, is intended to cover various modifications and equivalent arrangements included within the spirit and scope of the accompanying claims.

<Description of Reference Numerals>

| | |
|---|---|
| 10: Engine | 20: Motor |
| 30: Engine clutch | 60: Battery |
| 70: Integrated starter-generator (ISG) | |
| 300: Control unit | |
| 320: Coasting determination unit | |
| 330: Regenerative braking mode changing unit | |
| 340: SOC determination unit | 350: ISG speed control unit |

What is claimed is:

1. A method of controlling charging and discharging for a hybrid vehicle, wherein the hybrid vehicle includes a motor operated by power of a battery and an integrated starter-generator (ISG) configured to start an engine or generate electric power by torque of the engine, the method comprising:
    changing, by a control unit, a running mode of the hybrid vehicle to a regenerative braking mode when the hybrid vehicle is coasting;
    controlling, by the control unit, the motor to generate electric power in the regenerative braking mode;
    determining, by the control unit, whether a state of charge (SOC) of the battery is a charge limiting state; and
    operating, by the control unit, the ISG by electric power generated by the motor when the SOC of the battery is the charge limiting state.

2. The method of claim 1, further comprising:
    charging, by the control unit, the battery with the electric power generated by the motor up to the charge limiting state when the SOC of the battery is not the charge limiting state, and then operating the ISG by the electric power generated by the motor when the SOC of the battery is the charge limiting state.

3. The method of claim 2, wherein the operating of the ISG by the electric power generated by the motor comprises setting a speed of the ISG based on a speed of the engine and a predetermined friction torque map related to operation of the engine.

4. The method of claim 2, wherein, when operating the ISG, an engine clutch configured to control power transmission between the engine and the motor is in an open state.

5. A method of controlling charging and discharging for a hybrid vehicle, wherein the hybrid vehicle includes a motor operated by power of a battery and an integrated starter-generator (ISG) configured to start an engine or generate electric power by torque of the engine, the method comprising:
    changing, by a control unit, a running mode of the hybrid vehicle to a regenerative braking mode when the hybrid vehicle is coasting;
    controlling, by the control unit, the motor to generate electric power in the regenerative braking mode; and
    operating, by the control unit, the ISG by electric power generated by the motor.

6. A system for controlling charging and discharging for a hybrid vehicle, the system comprising:
    a motor configured to be operated by power of a battery;
    an integrated starter-generator (ISG) configured to start an engine or generate electric power by torque of the engine;
    an engine clutch configured to control power transmission between the engine and the motor; and
    a control unit configured to operate the ISG using electric power generated by the motor in a regenerative braking mode when the hybrid vehicle is coasting and the battery is in a charge limiting state.

7. The system of claim 6, wherein the control unit comprises:
    a coasting determination unit configured to determine whether the hybrid vehicle is in a coasting state based on a signal according to manipulation of an accelerator pedal and a brake pedal;
    a regenerative braking mode changing unit configured to change a running mode to the regenerative braking mode when the hybrid vehicle is in the coasting state;
    a state of charge (SOC) determination unit configured to determine an SOC of the battery; an ISG speed control unit configured to control a speed of the ISG based on a speed of the engine and a predetermined friction torque map related to operation of the engine; and a charging/discharging control unit configured to control charging and discharging based on signals from the coasting determination unit, the regenerative braking mode changing unit, the SOC determination unit, and the ISG speed control unit while the hybrid vehicle is coasting.

8. A non-transitory computer readable medium containing program instructions for controlling charging and discharging of a hybrid vehicle and being executed by a control unit, wherein the hybrid vehicle includes a motor operated by power of a battery and an integrated starter-generator (ISG) configured to start an engine or generate electric power by torque of the engine and the control unit configured to control the motor and the ISG, the computer readable medium comprising:
    program instructions that change a running mode of the hybrid vehicle to a regenerative braking mode when the hybrid vehicle is coasting;
    program instructions that control the motor to generate electric power in the regenerative braking mode;
    program instructions that determine whether a state of charge (SOC) of the battery is a charge limiting state; and
    program instructions that operate the ISG by electric power generated by the motor when the SOC of the battery is the charge limiting state.

9. The computer readable medium of claim 8, further comprising:
   program instructions that charge the battery with the electric power generated by the motor up to the charge limiting state when the SOC of the battery is not the charge limiting state, and then operating the ISG by the electric power generated by the motor when the SOC of the battery is the charge limiting state.

10. The computer readable medium of claim 9, wherein the program instructions that operate the ISG by the electric power generated by the motor comprise program instructions that set a speed of the ISG based on a speed of the engine and a predetermined friction torque map related to operation of the engine.

11. The computer readable medium of claim 9, wherein when operating the ISG, an engine clutch configured to control power transmission between the engine and the motor is in an open state.

* * * * *